(12) United States Patent
John et al.

(10) Patent No.: US 10,693,921 B2
(45) Date of Patent: Jun. 23, 2020

(54) SYSTEM AND METHOD FOR DISTRIBUTED MOBILE NETWORK

(71) Applicant: Futurewei Technologies, Inc., Plano, TX (US)

(72) Inventors: Kaippallimalil Mathew John, Carrollton, TX (US); Ulas Can Kozat, Mountain View, CA (US); Mazin Ali Al-Shalash, Frisco, TX (US); Khosrow Tony Saboorian, Plano, TX (US); Tushar Chouhan, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/148,893

(22) Filed: Oct. 1, 2018

(65) Prior Publication Data

US 2019/0141095 A1    May 9, 2019

Related U.S. Application Data

(60) Provisional application No. 62/581,395, filed on Nov. 3, 2017.

(51) Int. Cl.
*H04L 29/06* (2006.01)
*H04W 36/00* (2009.01)
(Continued)

(52) U.S. Cl.
CPC ...... *H04L 65/1083* (2013.01); *G06F 9/45558* (2013.01); *H04L 43/10* (2013.01);
(Continued)

(58) Field of Classification Search
CPC . H04L 65/1083; H04L 67/146; H04L 67/145; H04L 65/1003; H04L 63/0807;
(Continued)

(56) References Cited

U.S. PATENT DOCUMENTS

| 9,609,543 B1* | 3/2017 | Vivanco | H04W 28/0268 |
| 2003/0144860 A1* | 7/2003 | Casati | G06Q 10/10 709/223 |

(Continued)

FOREIGN PATENT DOCUMENTS

WO    2016025321 A1    2/2016

OTHER PUBLICATIONS

Taleb et al.,"On Service Resilience in Cloud-Native 5G Mobile Systems," IEEE Journal on Selected Areas in Communications, 2016, 28 pages.

*Primary Examiner* — Michael A Keller
(74) *Attorney, Agent, or Firm* — Slater Matsil, LLP

(57) ABSTRACT

According to one aspect of the present disclosure, there is provided a method, by a virtual network function, that includes: receiving a first request from a user equipment (UE), the first request including first parameters and a first token, the first token being a vector value corresponding to a session state for the UE; determining the session state for the UE according to the first token; programming network resources according to the session state, the programming updating states of the network resources, wherein the session state for the UE is updated when the states of the network resources are updated; producing a second token corresponding to the updated session state for the UE; storing the updated session state and the second token; and transmitting the second token to the UE.

18 Claims, 11 Drawing Sheets

200

(51) Int. Cl.
*G06F 9/455* (2018.01)
*H04L 12/26* (2006.01)
*H04L 29/08* (2006.01)

(52) U.S. Cl.
CPC ...... *H04L 63/0807* (2013.01); *H04L 65/1003* (2013.01); *H04L 67/145* (2013.01); *H04L 67/146* (2013.01); *H04W 36/0033* (2013.01); *G06F 2009/45595* (2013.01); *H04L 63/10* (2013.01)

(58) Field of Classification Search
CPC ..... H04L 43/10; H04L 63/10; H04L 43/0817; H04W 36/0033; G06F 9/45558; G06F 2009/45595
See application file for complete search history.

(56) References Cited

U.S. PATENT DOCUMENTS

| | | | |
|---|---|---|---|
| 2008/0215760 A1* | 9/2008 | Song | H04L 67/1095 709/248 |
| 2010/0106512 A1* | 4/2010 | Hyndman | G06Q 10/10 705/1.1 |
| 2014/0180870 A1* | 6/2014 | Bombeck | G06Q 30/0609 705/26.35 |
| 2016/0234730 A1 | 8/2016 | John et al. | |
| 2017/0085628 A1 | 3/2017 | Mahindra et al. | |
| 2017/0142206 A1 | 5/2017 | Kodaypak et al. | |
| 2017/0311290 A1 | 10/2017 | Adjakple et al. | |
| 2018/0060572 A1* | 3/2018 | Singleton | G06F 21/53 |
| 2018/0322538 A1* | 11/2018 | Linnamaki | H04L 67/02 |

\* cited by examiner

SYSTEM AND METHOD FOR DISTRIBUTED MOBILE NETWORK

PRIORITY CLAIM

This application claims the benefit of U.S. Provisional Application No. 62/581,395, filed Nov. 3, 2017, and entitled "System and Method for Distributed Mobile Network," which application is incorporated herein by reference.

TECHNICAL FIELD

The present invention relates generally to a system and method for networking, and, in particular embodiments, to a system and method for a distributed mobile network.

BACKGROUND

In distributed mobile networks, network functions are virtualized as services, sometimes referred to as micro-services. Micro-service based implementations of network functions rely on dynamic discovery and state replication across distributed virtual instances, which may provide services that support dynamic scaling and high levels of fault tolerance. A high level of consistency is needed for replication of state information for some services, where majority of a quorum of micro-services typically agree on the running state of the network and sessions. Reliable, strong, and high-performance consistency is needed for such replication.

SUMMARY

According to one aspect of the present disclosure, there is provided a method, by a virtual network function, that includes: receiving a first request from a user equipment (UE), the first request including first parameters and a first token, the first token being a vector value corresponding to a session state for the UE; determining the session state for the UE according to the first token; programming network resources according to the session state, the programming updating states of the network resources, wherein the session state for the UE is updated when the states of the network resources are updated; producing a second token corresponding to the updated session state for the UE; storing the updated session state and the second token; and transmitting the second token to the UE.

Optionally, in any of the preceding aspects, another implementation of the aspect further includes: receiving a second request from the UE, the second request including the second token; determining a mismatch in session state for the UE according to the second token; polling the network resources to determine states of the network resources; reconstructing the session state for the UE according to the states of the network resources; producing a third token corresponding to the reconstructed session state for the UE; storing the reconstructed session state and the third token; and transmitting the third token and rollback parameters to the UE, the rollback parameters including information about the reconstructed session state. Optionally, in any of the preceding aspects, a further implementation of the aspect provides that determining the mismatch in session state for the UE includes: retrieving the session state for the UE according to the second token; and determining the retrieved session state corresponds to a fourth token, the fourth token being different from the second token. Optionally, in any of the preceding aspects, a further implementation of the aspect provides that polling the network resources includes: retrieving policy information from the network resources. Optionally, in any of the preceding aspects, a further implementation of the aspect provides that polling the network resources includes: retrieving location information, profile information, and authorization information for the UE from the network resources. Optionally, in any of the preceding aspects, a further implementation of the aspect provides that polling the network resources includes: determining connection states of the network resources. Optionally, in any of the preceding aspects, a further implementation of the aspect provides that the virtual network function is one of a plurality of virtual network functions, and where storing the updated session state and the second token includes: storing the updated session state and the second token in a first data store, the first data store being one of a plurality of data stores; and replicating the updated session state from the first data store to other ones of the data stores. Optionally, in any of the preceding aspects, a further implementation of the aspect provides that replicating the updated session state includes: marking replication of the updated session state as complete in response to determining a quorum of the data stores agree on the session state for the UE. Optionally, in any of the preceding aspects, a further implementation of the aspect provides that storing the updated session state and the second token in the first data store includes: indicating a consistency level and a priority level for the updated session state to the first data store, the consistency level being a size of the quorum of the data stores, the priority level being an allocation and retention priority for the session state for the UE.

According to one aspect of the present disclosure, there is provided a method, by a user equipment (UE), that includes: sending a first request to a virtual network function, the first request including first parameters and a first token, the first token being a vector value corresponding to a session state for the UE; receiving a first response from the virtual network function, the first response including a second token, the second token being a vector value corresponding to an updated session state for the UE; and after receiving the first response, sending a second request to the virtual network function, the second request including second parameters and the second token.

Optionally, in any of the preceding aspects, another implementation of the aspect further includes: receiving a second response from the virtual network function, the second response including a third token and rollback parameters, the rollback parameters including information about a reconstructed session state for the UE. Optionally, in any of the preceding aspects, a further implementation of the aspect further includes: accepting the reconstructed session state in response to determining the UE is able to accept the reconstructed session state; and transitioning to the reconstructed session state. Optionally, in any of the preceding aspects, a further implementation of the aspect further includes: rejecting the reconstructed session state in response to determining the UE is unable to accept the reconstructed session state; and re-initializing a new session with the virtual network function. Optionally, in any of the preceding aspects, a further implementation of the aspect further includes: rejecting the reconstructed session state in response to determining the UE is unable to accept the reconstructed session state; and partially rolling back to a previous session state with the virtual network function.

According to one aspect of the present disclosure, there is provided a system that includes: a plurality of replication entities; and a plurality of virtual network functions in communication with the replication entities, each of the virtual network functions being configured to: receive a request from a user equipment (UE), the request indicating keys and a first token for the UE, the first token identifying a session state for the UE to each of the virtual network functions; and update the session state for the UE in response to determining a quorum of the replication entities agree on the session state for the UE.

Optionally, in any of the preceding aspects, another implementation of the aspect provides that each of the virtual network functions are further configured to: program network resources according to the request from the UE, the programming resulting in an update for the session state for the UE; and store the updated session state in the replication entities. Optionally, in any of the preceding aspects, a further implementation of the aspect provides that each of the virtual network functions are further configured to: transmit information about the updated session state to the UE. Optionally, in any of the preceding aspects, a further implementation of the aspect provides that each of the virtual network functions are further configured to: indicate priorities of records to the replication entities according to an allocation and retention priority. Optionally, in any of the preceding aspects, a further implementation of the aspect provides that each of the replication entities are configured to: cache records stored in the replication entities; and push the cached records to the virtual network functions according to feedback from dynamic service discovery.

According to one aspect of the present disclosure, there is provided a network function that includes: a non-transitory memory storage including instructions; and one or more processors in communication with the memory, where the one or more processors execute the instructions to: receive a first request from a user equipment (UE), the first request including first parameters and a first token, the first token being a vector value corresponding to a session state for the UE; determine the session state for the UE according to the first token; program network resources according to the session state, the programming updating states of the network resources, wherein the session state for the UE is updated when the states of the network resources are updated; produce a second token corresponding to the updated session state for the UE; store the updated session state and the second token; and transmit the second token to the UE.

According to one aspect of the present disclosure, there is provided a user equipment (UE) that includes: a non-transitory memory storage including instructions; and one or more processors in communication with the memory, where the one or more processors execute the instructions to: send a first request to a virtual network function, the first request including first parameters and a first token, the first token being a vector value corresponding to a session state for the UE; receive a first response from the virtual network function, the first response including a second token, the second token being a vector value corresponding to an updated session state for the UE; and after receiving the first response, send a second request to the virtual network function, the second request including second parameters and the second token.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the embodiments discussed herein are merely illustrative and do not serve to limit the scope of the claims. Further, it should be understood that various changes, substitutions and alterations can be made herein without departing from the spirit and scope of this disclosure as defined by the appended claims.

Meeting strong consistency requirements of distributed networks may come at the expense of a lack of function availability during failures and partitions among quorum members. Consistency addresses whether all members of a distributed network see the same data, particularly when the data is distributed across the network. Furthermore, the rate at which sessions and network states can be updated may be slowed down during such a failure. "Eventual consistency" is a replication scheme where a minority of functions (and in some embodiments, only one function) make decisions, take actions, and update the rest of the quorum about the result. "Eventual consistency" may lead to more available and faster services. However, one side effect of "eventual consistency" is that state updates to quorum members may be late or even out of order due to hard failures (e.g., node failures) or soft failures (e.g., congestion, packet losses, etc.) in the system. As a result, highly available services can obtain inconsistent network or session states when different virtual network function (VNF) instances are accessed over time. In accordance with some embodiments, "eventually consistent" systems manage potential inconsistencies by detecting and diagnosing inconsistencies, and if possible, returning to a state where users and network functions can continue to operate in a predictable manner. As such, the use of some embodiment consistency techniques may allow higher network availability to be achieved without jeopardizing the operational state of the network.

Figure 1:
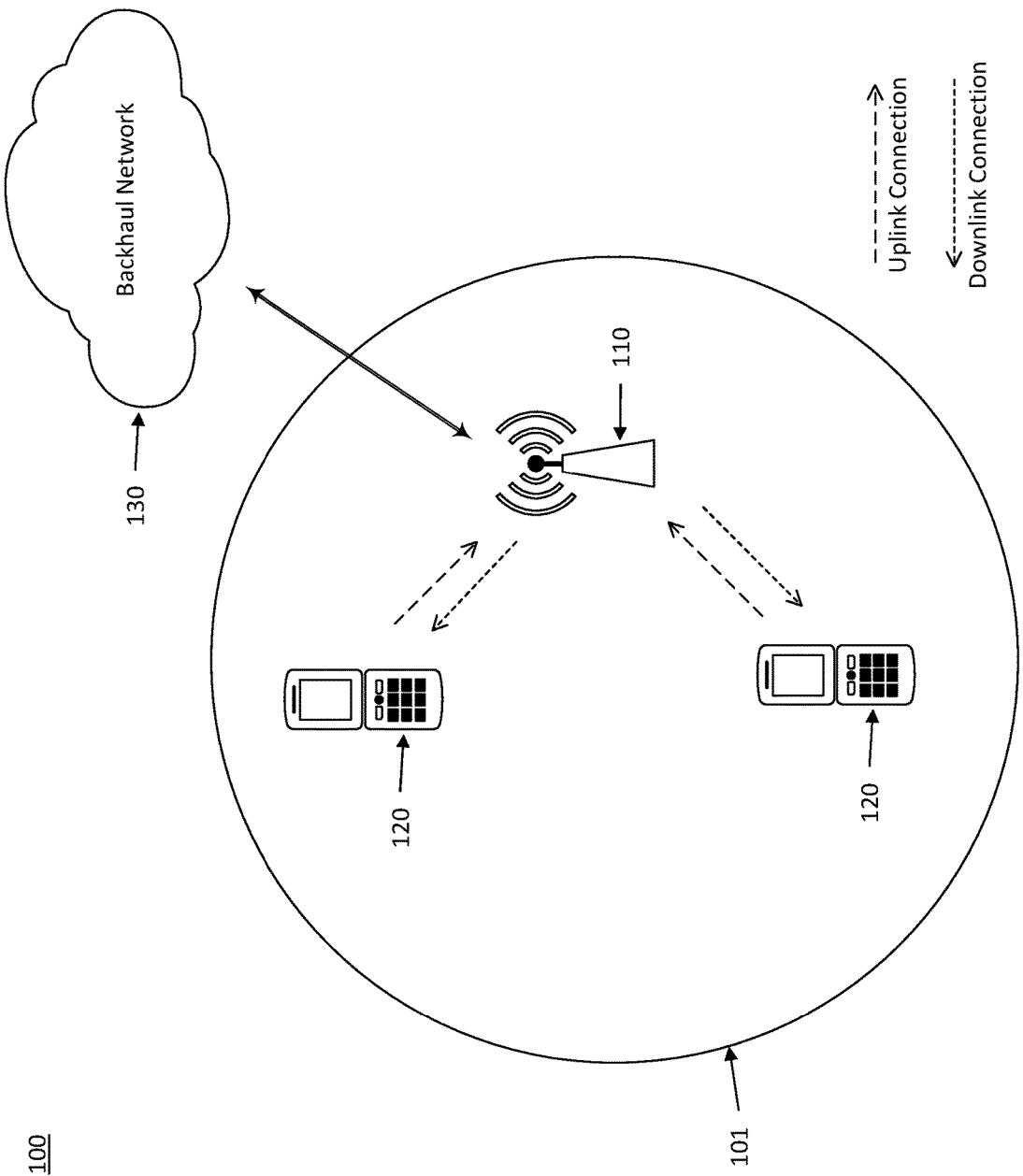
FIG. 1 is a diagram of a wireless communications network, in accordance with some embodiments.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
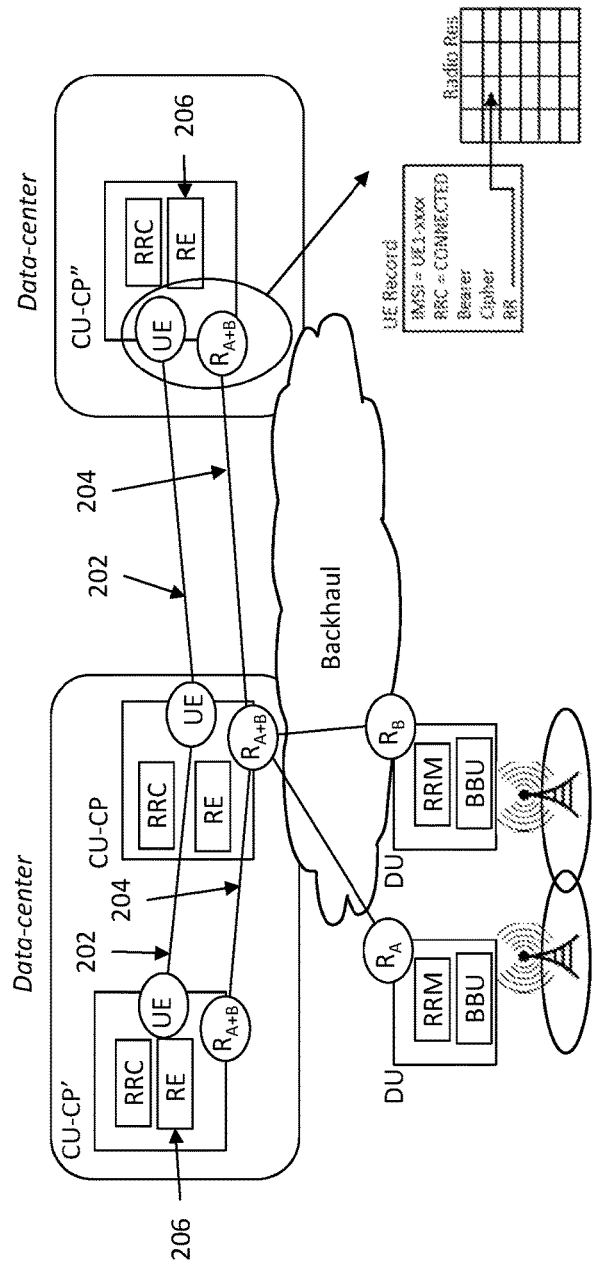
FIG. 2 shows a distributed network, in accordance with some embodiments.

In embodiments where the network 100 is a mobile network, there is the notion of a "serving entity" for a function (e.g., Radio Resource Control (RRC) and Access Management Function (AMF)) which serves as the "master" for that functional aspect for the UE. The serving entity processes requests, coordinates with resources and other network entities, and holds the session state. Many such disaggregated functions can together provide network services for the UE session. The term "UE session" refers to a context for the UE, which includes contexts for authorization, policies, charging, and mobility under which network services and resources are consumed. In distributed networks, such as the network 200 shown in FIG. 2, tracking and storing the states of the network and UEs may be performed by different systems than those that perform processing for the network functions. For example, the state for the connections 202 and resources 204 may be replicated across multiple entities CU-CP, CU-CP', CU-CP" and networks for high levels of failure handling, load balancing, or other operator policy objectives. Replication may be performed by replica entities (REs) 206, and may be coordinated by one of the REs 206, sometimes referred to as a master RE. Since the overall system needs to be highly available in the presence of network and server failures, consistency is relaxed. During normal operation, the state is ordered between the "serving entity" and the UE as a result of the mechanisms built into the control protocol. However, the state is not totally ordered between the serving entity and replicas. In accordance with some embodiments, the network 200 includes mechanisms for detecting and recovering from out-of-order states. During normal operation, the state is ordered between the "serving entity" CU-CP and the UE as a result of the mechanisms built into the control protocol. However, the state is not totally ordered between the serving entity CU-CP and replicas. In the case of failure of a serving node CU-CP, another server CU-CP' or CU-CP" in the cluster can handle requests from the user (new serving node), but in such situations, the state information may not be completely synchronized to the new serving node, e.g., the state may be only be partially ordered as a result of high availability updates and multiple failures.

For establishing and managing a user's connection resources, the network wo authenticates the user's connection, downloads authorization and other policies, obtains security vectors, and tracks the connection state. Some operations, such as authentication or resource allocation, need high consistency and are less sensitive to delay, and other operations like state updates can tolerate some inconsistency but are more delay sensitive. Embodiment replication services offer varying levels of consistency.

Mobile control plane interactions tend to be I/O-bound, i.e., the amount of processing required is small compared to the amount of messages exchanged. Replication in such systems may add further stress by increasing the number of messages exchanged. State changes occur on a per-UE basis, and the need for overall consistency means that updates are rapidly propagated. To allow the system to operate more efficiently, users and connections of high priority (e.g., 3GPP allocation and retention priority (ARP)) are disrupted less than other users and connections. In accordance with some embodiments, requests are prioritized.

A mobile control plane is inherently stateful. Separating state data storage from network function (NF) logic allows each entity to be scaled independently. The NF logic can be virtual or real. However, this separation between data storage and NF logic also introduces processing overhead. If the data record needed to process the control message from the UE is available ahead of time (i.e., cached in RAM) at the NF, it can contribute to speeding up processing significantly. In accordance with some embodiments, the interface between the NF and replication system may be used to pre-fetch records.

Thus, in embodiments systems, the interface between the NF and replication engine may have varying levels of consistency, and the replication engine itself may be able to recover from out-of-order states for high availability modes. Further, the NF-replication engine interface may be able to convey priority and pre-emption as well as support caching of state records to speed up processing.

Figure 3:
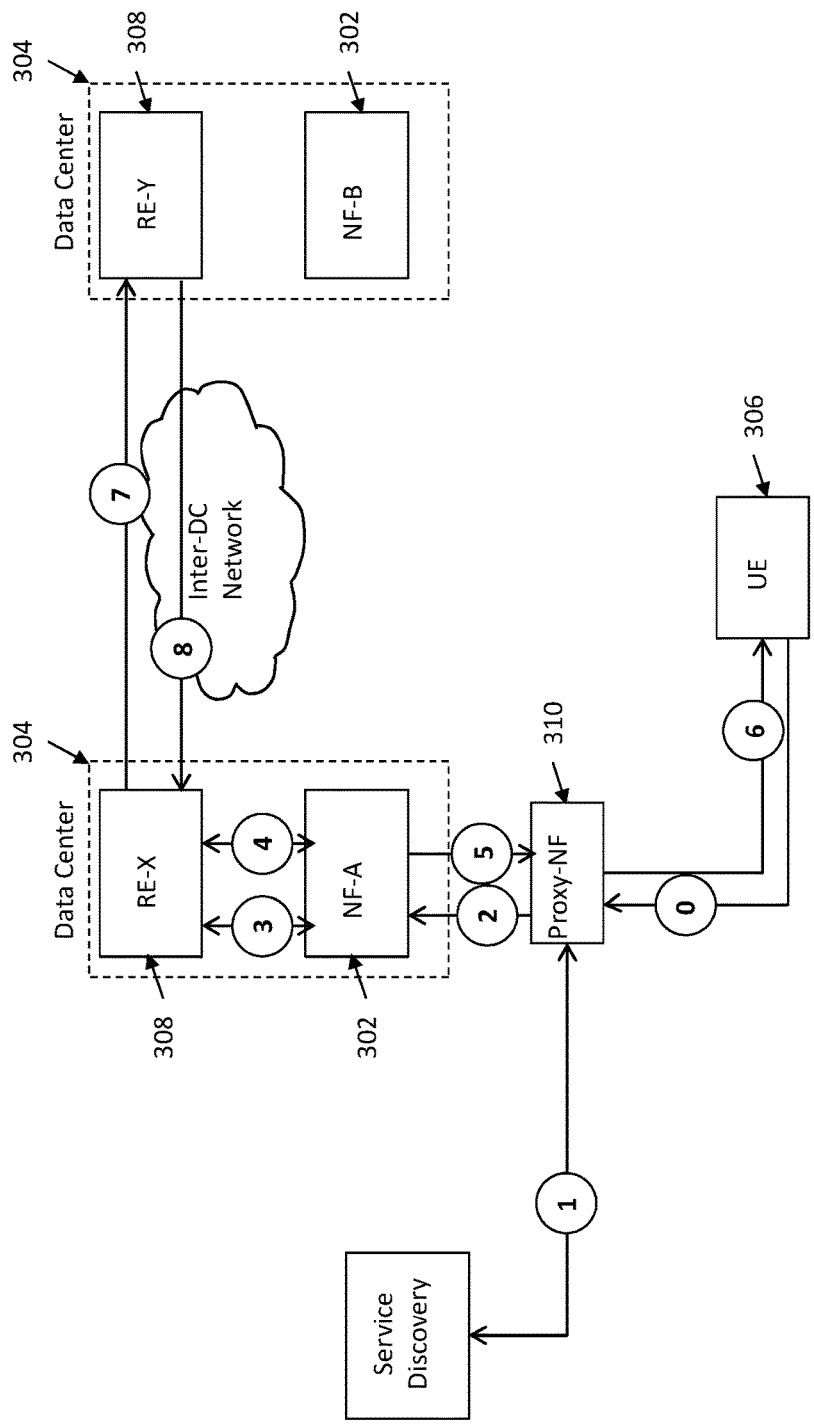
FIG. 3 is a diagram of a network that manages out-of-order states, in accordance with some embodiments.

FIG. 3 is a diagram of a network 300 that manages out-of-order states, and illustrates message flow in the network 300 during request handling, in accordance with some embodiments. Out-of-order states are managed by inserting a token in network requests to manage network states. The token is managed by the master replica entity (e.g., RE-X in the example shown). The token value represents a global connection/session state across the entire system, and is shared across network agents, replication entities and the client (e.g., UE).

In the network 300, NF instances 302 are geo-replicated, cloud based NFs. The NFs 302 are distributed across data centers 304, but there is only one "serving entity" for a UE 306 at any given time. The data centers 304 are connected by an inter-data-center (inter-DC) network. For example, in FIG. 3, NF-A is illustrated as serving the UE 306. As an example, the NF-A may be a centralized unit (CU) for 3GPP radio. Notably, there may be a "master" or active replica entity (RE) 308 that manages replication across itself and other "slave" or passive REs 308. For example, in FIG. 3, RE-X is the active RE and RE-Y is the passive RE. A proxy-NF 310 proxies signaling messages between the UE 306 and the destination NF 302.

In some embodiments, the NFs 302 are implemented as cloud-based NFs, which allows them to be distributed and replicated more easily than node based systems that use a managed backplane. Such NFs depend on replication and consensus to implement high reliability and fault tolerance. For example, data of a same RRC function may be replicated within and across data centers.

For distributed and replicated NFs 302, the quantity of replicas may correspond to the fault tolerance required, and these instances may be distributed across data centers for geo-redundancy. The cluster for replication is scaled independently of the NF, but there may be an affinity between the NF instance and the master RE instance.

FIG. 3 also illustrates message flow in the network 300 during steps of a method for request handling by the NFs 302. In step 0, the UE 306 initiates a service request to a NF 302. The message is forwarded to the proxy-NF 310. For example, in the case of an RRC connection setup, the proxy-NF 310 may be a radio distributed unit (DU). There may be a similar pattern for Non Access Stratum (NAS) messaging; for example, when the UE 306 initiates a service request for AMF, the request may be proxied by RRC, and when the UE 306 initiates a service request for Session Management Function (SMF), the request may be proxied by AMF.

In step 1, the proxy-NF 310 initiates a dynamic service discovery request for the NF 302, wherein the dynamic service discovery request was requested by the UE 306. The response to the discovery request includes an ordered list of NF 302 instances for the UE 306 to signal. For example, in FIG. 3, the UE 306 signals instance NF-A.

In step 2, the UE 306 performs signaling to the discovered instance, e.g., NF-A. Before signaling to the discovered instance, the UE 306 may have previously established cipher keys for secure communication with the NF 302. Alternatively, the cipher keys may be established in initial steps of the signaling.

In step 3, NF-A processes the incoming request and extracts the data key (e.g., S-TMSI at RRC) and token id in the message ($T_M$). NF-A then requests stored state information from RE-X, which may be a replication engine and state repository. The RE-X returns the state information, which includes a token id from the repository ($T_R$). If the token ids match (e.g., if $T_M=T_R$), then NF-A handles the request from the UE. The tokens are data types such as integer values, vector values, or the like. In some embodiments, the tokens are vector values.

In step 4, NF-A completes handling of the message, which may include a change in state, and requests that RE-X store and replicate the new state. The RE-X completes storing of the new state, and responds with new token id ($T_R'$).

In step 5, NF-A responds to the UE 306 with a message, which includes or indicates the new session token ($T_R'$).

In step 6, the proxy-NF 310 forwards the entire message, including the new session token ($T_R'$) to the UE 306. The UE 306 then uses this new token in subsequent requests to the NF-A (e.g., through the proxy-NF 310). Information about the new session state is included with the new session token. The session state information sent to the UE 306 may be different from the session state information stored at the NFs, and includes information that allows the UE 306 to have synchronized understandings of the session state with the NFs. For example, the session state information sent to and stored at the UE may comprise information related to access, authorization, and resources granted by the network 100, while state information stored at the NFs may comprise information about the resources of the session as well as states needed for operating services associated with the session. Examples of such services associated with the session may include services for reserving radio resources, handling QoS, charging, performing mobility and route changes, providing legal intercepts, and the like.

In step 7, RE-X replicates the new state and session toke ($T_R'$) across the cluster. As noted above, the size of the cluster depends on the fault tolerance requirement of the network 300.

In step 8, the REs 308 exchange replication responses and agree on a quorum. The system is configured with the level of agreement that constitutes a quorum. For example, high availability and eventual consistency may require only RE-X to agree.

Steps 7 and 8 are not necessarily performed after steps 5 and 6. In particular, replication (steps 7 and 8) may be performed concurrently with UE messaging (steps 5 and 6). Concurrent processing may increase performance of the network 300. However, this disconnect between replication and messaging may result in inconsistent network states being synchronized across the REs 308.

Figure 4:
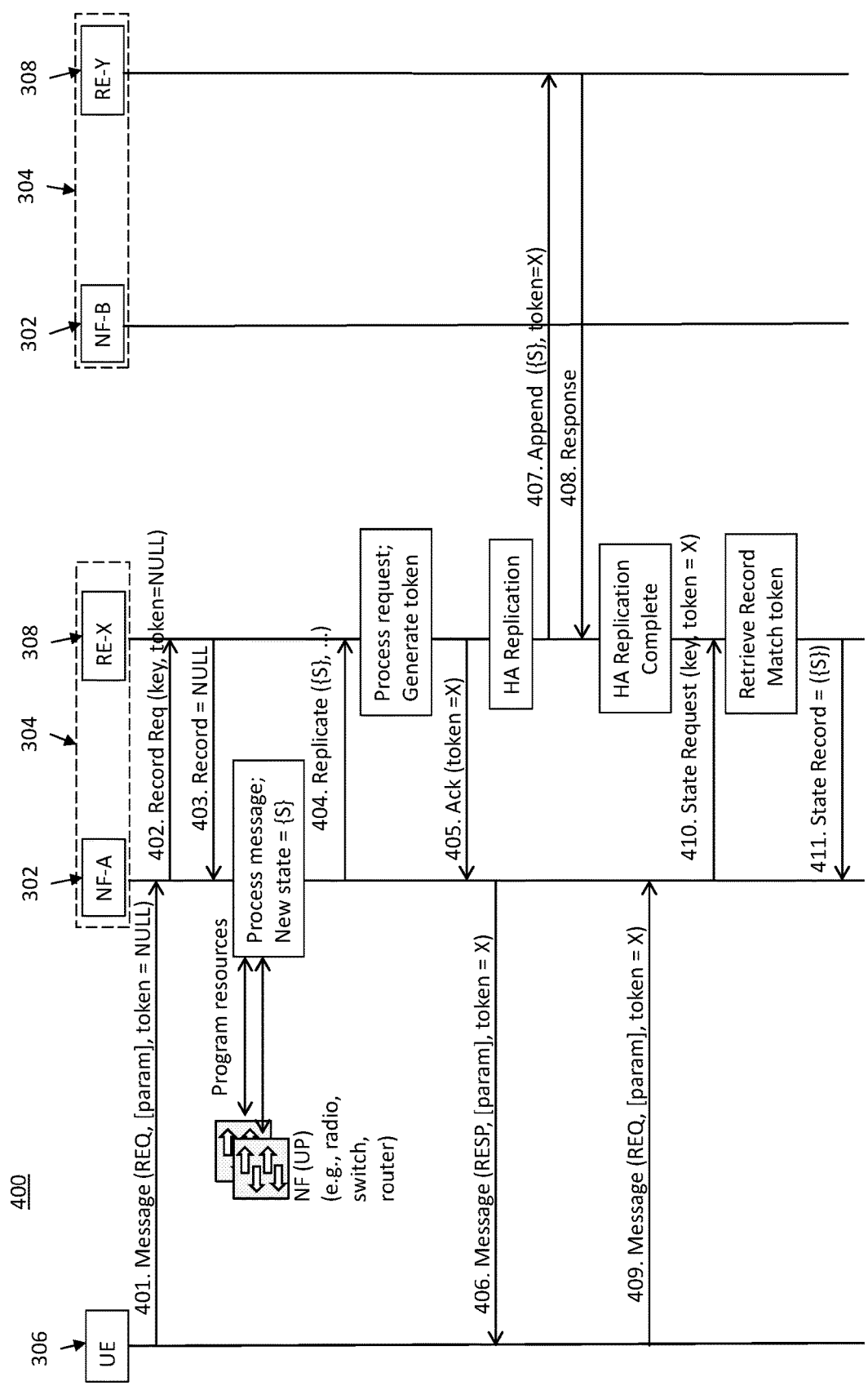
FIG. 4 is a protocol diagram of a sequence for interaction between a UE and a network, in accordance with some embodiments.

FIG. 4 is a protocol diagram of a sequence 400 for interaction between the UE 306 and network 300. The interaction may be to request, change, or delete connection and related state information. For example, the interaction between the UE 306 and the network 300 during the sequence 400 may be to register, setup, change, or delete connection/session states that alter network resources associated with the connection/session.

In step 401, the UE 306 sends a message with a request (e.g., attach request) and parameters ("[param]") for that request. In accordance with some embodiments, the message further includes a token field ("token") for tracking state for the UE 306. The token field may be set to NULL, which may be a reserved token value that is used to indicate no previous state in session. The UE 306 may include the NULL token value in an initial message or until a non-NULL token is returned by the server.

In step 402, the NF-A extracts the cipher and data keys ("key") from the request and verifies the token with RE-X. In the illustrated example, the token is NULL, so the RE-X returns a null record in step 403, to indicate that no record exists. The NF-A then processes the message, which may include programming resources associated with the request, such as radios, switches, routers, and the like. The resource programming may result in a change in state for the UE 306. Programming resources may involve interaction, by the NF-A, with other NFs (not shown). The programming updates states of the network resources. Session state information for the UE is updated based on the changed resource states or changed states of network services for the session. In step 4, the new state ("{S}") is sent to the RE-X for replication, which may include the level of consistency desired.

In step 405, the RE-X generates a new unique token for the session in response to successful replication, and transmits the new token to NF-A. Obtaining a new token value may be performed by a replica procedure at the master replica (e.g., RE-X in the example shown) that returns a next token value. The next token value may be an increment of a current value, a progression, etc., that is unique for at least the session. In step 406, NF-A responds to the UE 306 with a message that includes a response ("RESP") and the newly programmed parameters ("[param]"). In accordance with some embodiments, the message further includes a token field ("token") that indicates the new token value from RE-X. In subsequent messages, the UE 306 sends the new token value.

In step 407, RE-X replicates the new state information ("{S}") for UE 306 to other entities of the replication cluster (e.g., REP-Y). The new state information may be sent with an append state message, which includes both the new state information ("{S}") and the new token value. When replicating new state information, the master replica (e.g., RE-X in the example shown) inserts the new token value along with state information in a data store, and then replicates the new data (state and token values) to other REs 308 (e.g., RE-Y in the example shown). If a high level of consistency (e.g., HA) is requested, then RE-X acknowledges after locally replicating the data. Versioning information, such as version numbers, may also be tracked and replicated for the entries, which allows the REs 308 to handle consistency checking and quorum agreement among one another. In step 408, when a quorum of responses from the replication cluster is received, RE-X marks replication of the new state information as complete.

Although steps 405 through 408 are shown as being ordered steps, it should be appreciated that they may not be performed in the illustrated order. Indeed, as noted above, the steps may be performed out-of-order. For example, steps 407 and 408 can be performed in parallel or tandem with steps 405 and 406. In other words, replication of the new state information may be initiated (step 407) at the same time the new token is sent to the NF-A (step 405). Such out-of-order replication may improve overall performance at the cost of state consistency.

In step 409, a subsequent request from the UE 306 for the same session includes the current or most recent token value received from NF-A. The token value is included with other parameters in a request. In step 410, NF-A extracts the cipher and data keys ("key") and token ("token") from the request. NF-A then requests the state for the given token value from RE-X. In step 411, RE-X returns the current state record ("{S}") to NF-A in response to a token match, e.g., in response to the token value in the message matching the token value stored in RE-X. A match indicates the states tracked at the UE 306 and stored in the REs 308 are consistent. The NFs 302 are thus able to obtain and use the current state of the UE 306 in a distributed manner.

Figure 5:
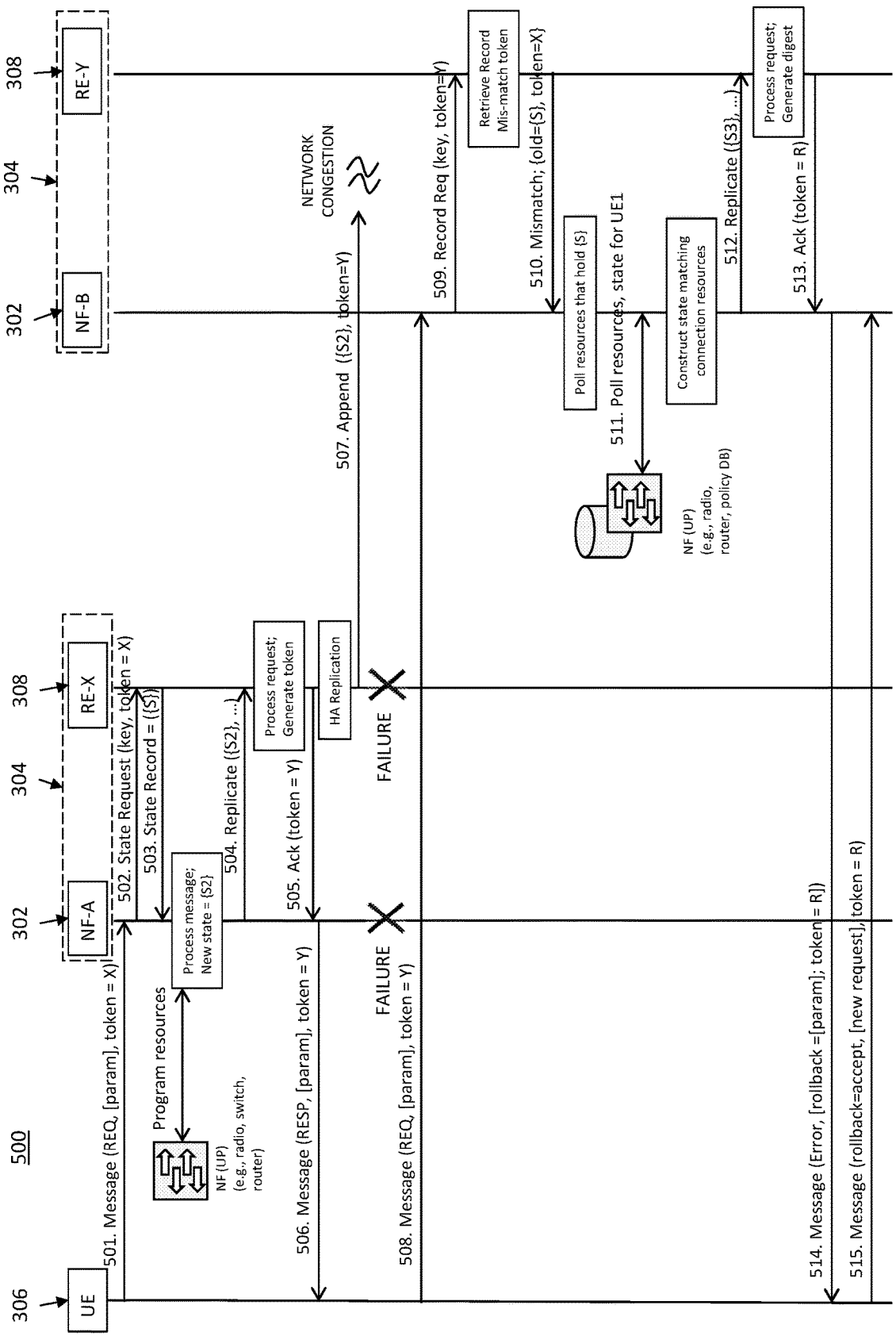
FIG. 5 is a protocol diagram of a sequence for recovering from a partial ordering failure in a network, in accordance with some embodiments.

FIG. 5 is a protocol diagram of a sequence 500 for recovering from a partial ordering failure in the network 300. Such failures may occur because consistency across distributed systems has a high latency in systems that replicate for high availability (HA). Such failures can affect the overall consistency of states in the network 300. In accordance with some embodiments, the token value included with requests and responses allows NFs and REs in the network 300 to recognize and recover from inconsistent states, such as partial order-of-order states. Such failures may be caused by an event that brings down a data center 304 (e.g., brings NF-A and RE-X offline), or by congestion in the network used by RE-X and RE-Y for replication.

State inconsistency is particularly likely to result when network failures occur after the new token is sent to the UE 306 (in step 406 of the sequence 400) but state replication has not completed (in step 407 of the sequence 400). For example, if the failure brings down NF-A, then subsequent requests from the UE 306 may be dynamically directed to NF-B by the proxy-NF 310. However, due to network congestion and partial ordering of data in the system for HA, the updated state of the UE 306 may have not yet replicated to other REs 308. Thus, the UE 306 may be in a new state, but NF-B may obtain an old state from RE-Y.

In step 501, the UE 306 sends a request to the NF-A, which includes the most recent token sent to the UE 306. In step 502, the NF-A requests the state for the UE 306 from RE-X using the token. In step 503, the RE-X returns the state to the NF-A in response to the token matching. The NF-A then processes the message, which may include programming resources associated with the request, such as radios, switches, routers, and the like. The resource programming may result in a change in state for the UE 306. In step 504, the new state is stored in RE-X for replication. In step 505, the RE-X generates and sends a new token to the NF-A in response to processing the replication request. In step 506, NF-A responds to the UE 306 with a message that includes the new token.

In step 507, RE-X begins replicating the new state information for UE 306 to other entities of the replication cluster (e.g., REP-Y). However, network congestion may prevent RE-Y from receiving the updated token and state information in a timely manner.

In step 508, the UE 306 sends a request to the NFs 302. The request includes the new token. However, a data center outage may result in a failure of NF-A and RE-X. As such, the proxy-NF 310 proxies the request from the UE 306 to NF-B. In step 509, NF-B extracts the token and cipher/data keys from the request, and attempts to retrieve the state information from RE-Y using the token and keys. However, RE-Y may have not yet received the updated token and state information. As such, the lookup with RE-Y results in a mismatch of state information, which is detected by RE-Y. For example, the token retrieved by RE-Y may correspond to a different point in the state machine than the state presented by NF-B. In step 10, RE-Y returns the old token and state information to NF-B. Receiving an old token indicates a state inconsistency to NF-B.

In step 511, NF-B starts a state recovery procedure in response to detection of the inconsistency. The state recovery procedure may include a variety of measures that depend on the type of data. During the recovery procedure, the network resources programmed in previous steps are polled to determine their current states. Example recovery procedures include: retrieving policy information from other databases; polling connection resources; retrieving location information, profile, and authorization information; polling network devices for connection states related to the session; and the like. The NF-B may manually reconstruct the state from the connection resources. During reconstruction, actual connection states retrieved from network devices are accepted as the current state. In some embodiments, polling is not performed, and the state recovery procedure comprises rolling back the session to an earlier state or restarting the session.

If the state reconstructed by the NF-B in step 511 is the same as the state return from the RE-Y in step 510, then NF-B returns a normal reply message to the UE 306 with new parameters and the new token. The sequence 500 then terminates early.

If the state reconstructed by the NF-B in step 511 is different from the state return from the RE-Y in step 510, the sequence 500 continues. In step 512, after reconstructing the connection state, NF-B sends a request to RE-Y to store the reconstructed state and initiate the replication process. In step 513, RE-Y performs replication and then returns a new token corresponding to the new state. In step 514, NF-B sends response to the UE 306 indicating an error state for the request. The error state indication also includes rollback parameters derived from the recovered state, as well as new token. In step 515, the UE 306 recovers and continues issuing requests. If the UE 306 is able to accept and transition to the recovered states, it accepts the state and transitions to it. If the UE 306 is not able to transition states, then it may partially rollback to a previous state or, as a worst-case recovery option, the NF-B and UE 306 may re-initialize the session. When a re-initialization is performed, the UE 306 rejects the recovered state, closes, and re-initiates the session. When a partial rollback is performed, the UE 306 rejects the recovered state and re-initializes the session to a previous state. Whether or not the UE 306 can transition states depends on the connection and operational state of the UE 306. Further, the NF-B and UE 306 may communicate to determine whether the UE 306 will accept the recovered state, perform a partial rollback, or re-initialize the session.

Figure 6:
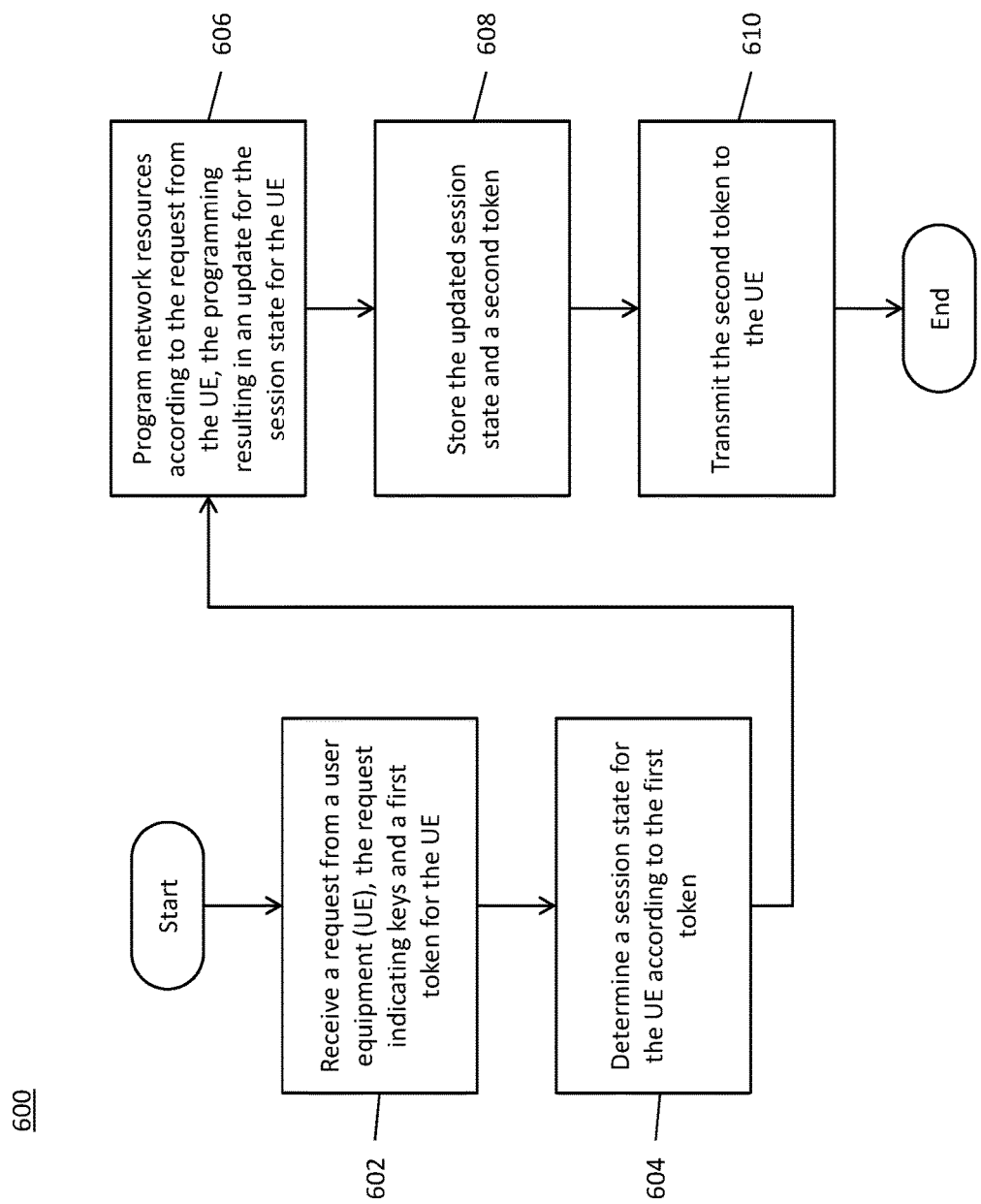
FIG. 6 is a flow diagram of a method for interaction between a UE and a network, in accordance with some embodiments.

FIG. 6 is a flow diagram of a method 600 for interaction between the UE 306 and network 300. The method 600 is performed by one or more NFs 302. In step 602, the NF receives a request from a user equipment (UE). The request indicates keys and a first token for the UE. For example, the request may include parameters and the first token, with the first token being a vector value corresponding to a session state for the UE. In step 604, the NF determines a session state for the UE according to the first token. Determining the session state may include looking up the session state from REs. In step 606, the NF programs network resources according to the request from the UE. The programming results in an update for the session state for the UE. For example, radios, switches, and routers may be programmed to serve the request. In step 608, the NF stores the updated session state and a second token. Storing may include updating the session state for the UE according to the new states of the network resources, and producing a second token corresponding to the updated session state. The second token is different from the first token, and both tokens may be simple values such as vector values. In step 610, the NF transmits the second token to the UE.

It should be appreciated that the UE 306 may perform analogous actions during the method 600. For example, the UE 306 may send the request to the NFs 302. When the NFs 302 transmit the token to the UE (e.g., in step 610), the UE 306 receives a response from the NFs 302 that includes the second token. Optionally, the UE 306 may perform subsequent steps, such as sending a second request to the NFs 302, the second request including the second token and parameters.

Figure 7:
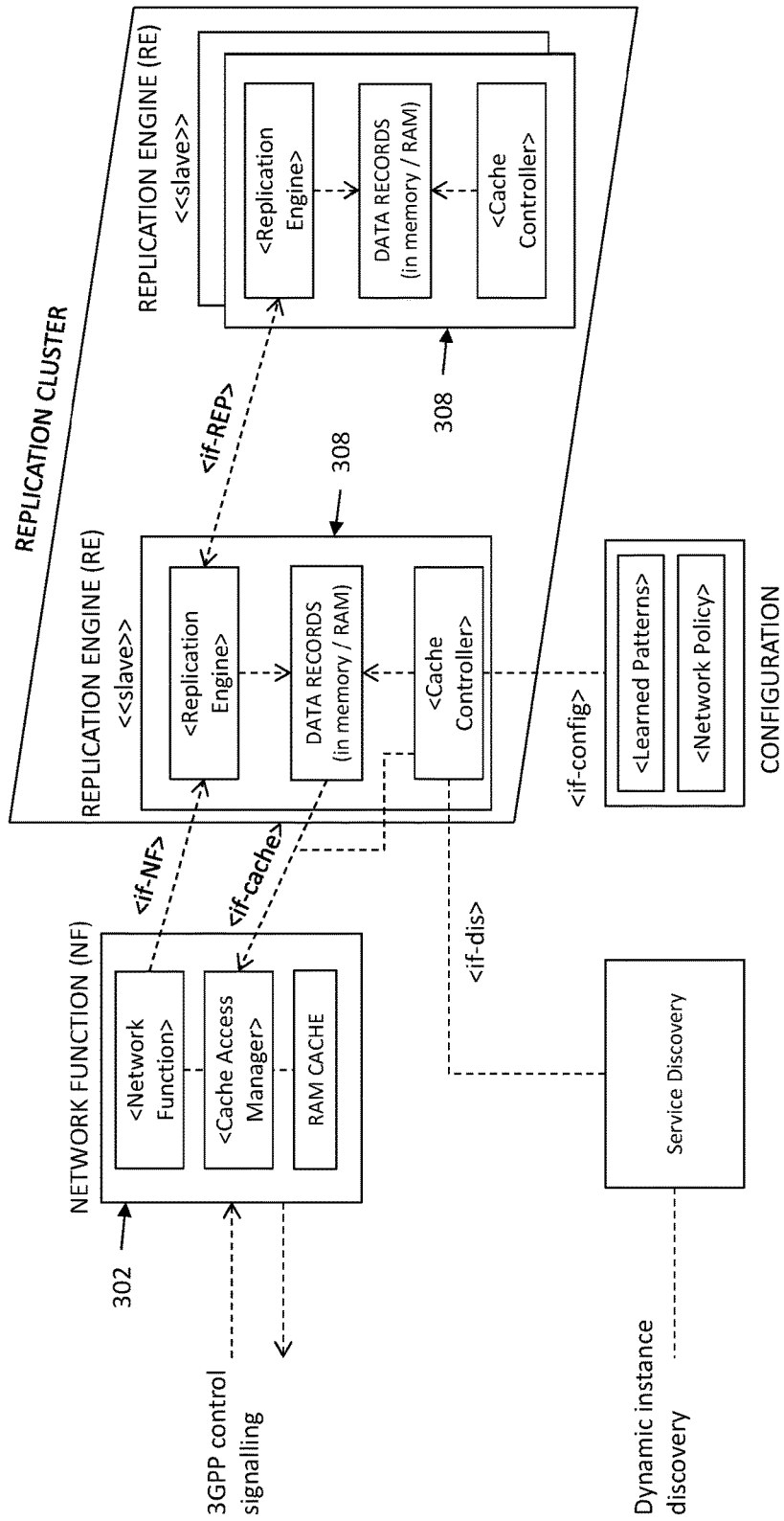
FIG. 7 shows a system that supports varying levels of replication across a data cluster, in accordance with some embodiments.
Figure 8:
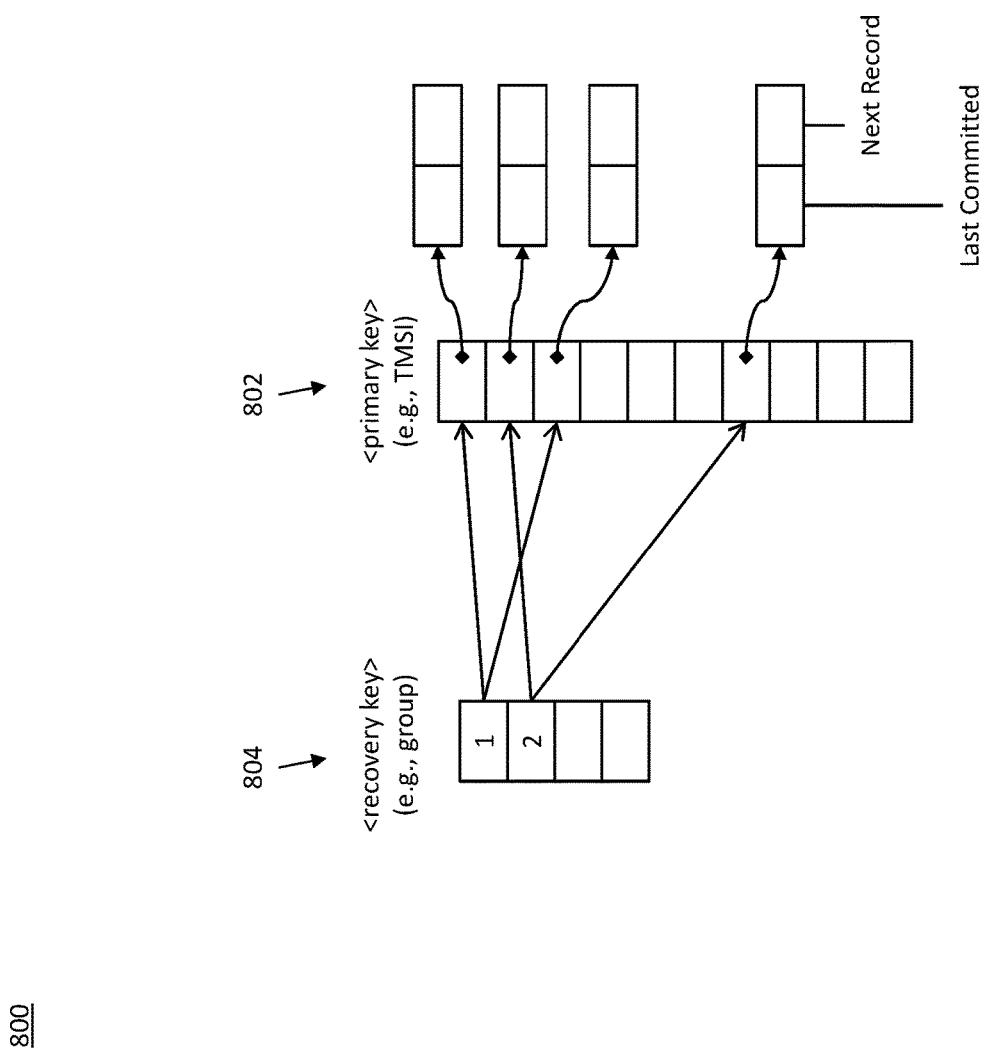
FIG. 8 shows a replication data structure, in accordance with some embodiments.
Figure 9:
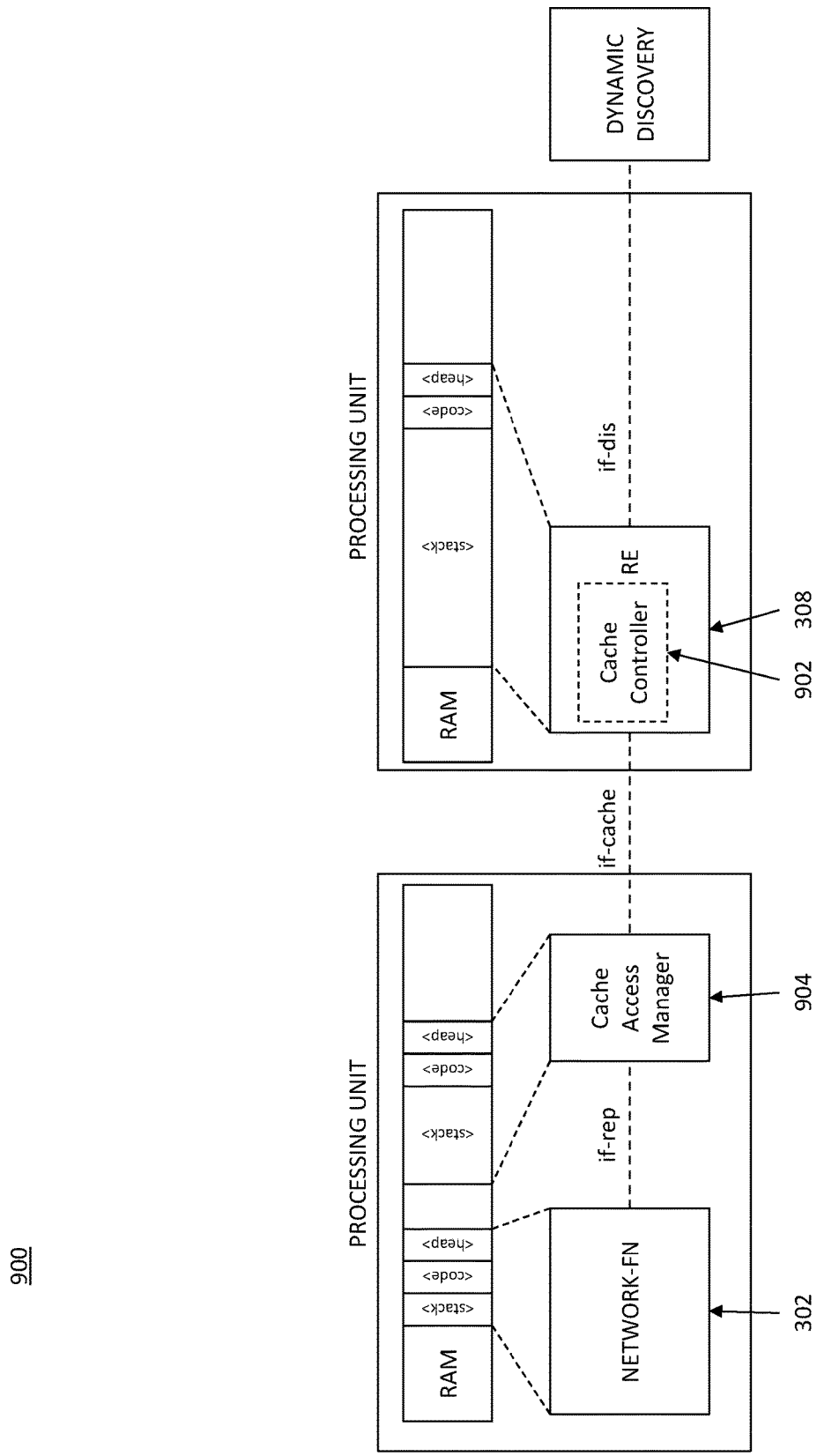
FIG. 9 is a diagram illustrating cache insertion and deletion, in accordance with some embodiments.

FIGS. 7 through 9 illustrate aspects of a replication system, in accordance with some embodiments. In particular, aspects of the REs 308 are shown.

FIG. 7 shows a system 700 that supports varying levels of replication across the data cluster. The system 700 includes a NF 302 that receives control signaling from a UE, reads state of the UE connection from a memory cache (e.g., RAM), and operates on the requests from the UE. When the NF 302 has processed the message and allocated network resources, it updates the state information for the UE and sends it to the REs 308 via the "if-NF" interface to be replicated.

Examples of such NFs are the RRC and AMF. In each of these, there is a state machine between the UE and RRC, and between the UE and AMF. For a UE, there is also the notion of a "serving entity," which is the NF that handles the requests from the user, processes permissions, and allocates resources. The replication cluster in the system 700 has a single leader and multiple followers (master-slave model of replication), which may be particularly suited for the serving entity model in 3GPP.

For each state update, the NF requests its corresponding RE update the state. Based on the level of consistency requested by the NF, the RE performs replication. If high availability is desired, the RE responds immediately after inserting the state data into local memory, and then proceeds to append the new state to other entities of the replication cluster. If higher consistency is desired, the RE responds to NF only after the required level of consistency (quorum) is met. Details of the interface ("if-NF") and operation are discussed further below.

The stateless operation desired for separately scaling the control NFs and data (in REs) may result in high latency and lower throughput in I/O-bound network functions. Prefetching and caching data (via the "if-cache" interface) may remove these disadvantages while still allowing independent scaling. Replication operation across REs in the replication cluster includes procedures to append, update, and delete entries.

Leader election and recovery may be more complex when state data is replicated in a highly available system. Embodiment recovery procedures may take into account the partial ordering of data and use methods that take the most recent updates.

The interface between NF-RE ("if-NF") is used to create, read, update and delete data records. The interface may have functions such as:

---

Create (consistency level, priority, persist, key, [data])
// creates a new state data record; returns success or failure.
    consistency level: consistency between 0 (High Availability) to 5 (High Consistency). Values 1-4 represent intermediate consistency. The RE is configured with number of responses that correspond to a quorum for a level of consistency.
    priority: level of priority for a UE/UE connection or slice. This corresponds to the value of 3GPP ARP (Allocation and Retention Priority). Priority is used in organizing the storage data structure, prioritized recovery.
    persist: TRUE/FALSE. If TRUE, data is stored in non-volatile memory.
    Key: key by which data is stored (e.g., TMSI)
    Data: TLV of sequence of state information.
Read (key)
// reads state data corresponding to the key; returns [data] or failure.
    Key: key by which data is stored (e.g., TMSI)
Update (key, [data])
// updates state data corresponding to the key; returns success or failure.
    Key: key by which data is stored (e.g., TMSI)
    Data: TLV of sequence of state information to be modified.
Delete (key)
// deletes state data corresponding to the key; returns success or failure.
    Key: key by which data is stored (e.g., TMSI)

---

For the operations above, RPC-like protocol semantics are assumed where the operation either succeeds, or if there is failure, no update is assumed. As shown, priorities of records are indicated to the replication entities according to ARP.

State data sent from the NF to the RE in Create and Update messages, and data removed in Delete messages, are stored in local memory and then replicated across the data cluster. The data structure for local storage is designed to allow parallel updates. FIG. 8 shows a replication data structure (RDS) 800.

The entries are organized as data records per primary key 802 (which is the key exchanged between the NF and RE). In addition to primary keys, recovery key based indexing may be used for prioritized recovery. The data records per primary key are organized as last committed and next recorded. The last committed record is one where there is a quorum in the data cluster. The next record is one for which the commit is in process. The recovery key 804 indicates the priority of stored records. Recovery may be prioritized according to priorities of records stored in the replication entities.

Since state transitions occur independently for a UE, each time there is an operation, the operation updates the state data record. The RE leader receives requests from the NF for replication through the NF-RE interface ("if-NF" in FIG. 7). The UE data record is replicated across the data cluster using a command such as:

AppendEntries RPC ([state data], control-info)

For a UE/NF (and its associated state), there is only one RE leader at any moment in time. The rest of the RE servers included in the replication domain are passive replicas that only copy the current state information of a UE sent from the RE leader. Control-info is used to send a count value (which is maintained on a per primary key basis).

Aspects of the RE leader will now be discussed. When handling a state update (result of NF-RE create/update/delete), the RE Leader wraps the data in an Append Entries RPC, and then logs the data in its memory before broadcasting it for replication.

On receiving a Received RPC (from followers), the Leader increments the count for the respective UE state and waits for the count to reach the quorum value. At this point it commits the message, and sends a response to the NF. For HA mode, the consistency level is reached by just the RE Leader copying the data to its local memory. The quorum is reached as configured (usually half or more of the data cluster).

On receiving the Update Record RPC, the RE leader checks the data to be updated in its own record, and updates the records. The RE leader then check the data requested by the followers and then send the message containing the latest data for the requested UE's.

The RE leader may also send heartbeat messages at regular intervals to the other RE servers for liveness. When failure of a leader is detected, leader election and recovery is initiated, as described below. The RE leader broadcasts a log checker message at regular intervals that helps in recovery of other RE data servers, as described below.

Aspects of the RE follower(s) will now be discussed. The follower receives a heartbeat message at every fixed interval, failing upon which it changes its state to "Candidate" and starts a leader election process, as described below.

When the RE follower receives the Heartbeat RPC, it resets its timer for state change to candidate.

When the RE follower receives the Append Entries RPC, it checks whether the information is new and then updates its log. It sends a received message to the Leader in case of successful replication. There are several conditions for sending Received RPC to the Leader: (1) if the term of the candidate is higher than their current term; and/or (2) if the term of the candidate is the same as its own current term, and its log data is more updated (e.g., has a higher version number).

When the RE follower receives a Request Vote RPC, it either grants the vote or ignores the message based on the same conditions as Received RPC.

When the RE follower receives Update Record RPC, it checks its own log to see if there is any UE whose state is out of date, and then appends all the IDs for the UE whose data is to be updated in a message sent to the leader to provide the required data. It also checks the out-of-date logs in the Leader and sends the updated version of the UE to the Leader. This may be helpful for faster recovery once the leader is decided during partial recovery implementations.

Election of the RE leader takes place during the recovery phase of a RE server/replica, or when the current leader has failed. Once the RE server changes to the candidate state, it starts to ask for a vote from the other RE servers in the data cluster, with a request to become the next leader through a Request Vote RPC. Each candidate has its own random timeout period, after which it re-broadcasts the Request Vote RPC. In case it does not get a majority of votes within that period, its state remains unchanged during the period. The RE servers compare the current term of the candidate asking for the vote.

A vote is given to the server in the following cases: (1) of the term of the candidate is higher than their current term; or (2) if the term of the candidate is the same as its own current term and the candidate has a maximum number of priority state records with latest term.

To help with safety, the procedure makes sure that only one leader is elected every round. If a candidate gives a vote to another candidate then it cannot give its vote to any other candidate with the same or lower term number. This may help ensure that, in case there is an odd number of servers, only one candidate will be selected. Further, the retry timeout for each candidate is randomized so no two of them ask for votes at the same time. To help with liveness, the random nature of asking for votes makes sure that one candidate is selected as the new leader.

RE servers begin in candidate state. In the candidate state, each RE server attempts to become the leader for the current term. Each candidate broadcasts the Request Vote RPC to the other RE servers to gain maximum votes. It remains in the candidate state as long as it does not receive majority of votes or acknowledge another RE server as the leader.

On receiving the Request Vote RPC the candidate grants its vote on the following conditions: (1) if the term of the candidate is higher than their current term; or (2) if the term of the candidate is the same as its own current term and its priority state records is more updated (e.g., has a higher version number).

On receiving the Heartbeat RPC message, the candidate turns into a follower and acknowledges the sender as the leader for the current term.

Recovery procedures may be performed. Embodiment recovery mechanisms involve a background update process to maintain consistency of state updates between the NF and RE, as well as the RE cluster. Each RE server maintains a record of its current term, last logged term, and the state data record per primary key. For recovery, and as background process, there is a protocol exchange that includes exchanging the set of key-version numbers. For example, the snapshot may be similar to: snapshot={N, $(K_1,VN_1)$, $(K_2,VN_2)$, $(K_3,VN_3)$, . . . $(K_n,VN_n)$}, for N data records with primary keys. Thus, if there are 100 state data records (with associated UEs/keys), there will be a sequence of 100 Key-Version Number values as shown above. A higher value of Version Number is more recent. The exchange may be protected by nonces for integrity of data, and encrypted as needed.

During initiation, the REs are awoken. On waking up, each RE starts in the Candidate state. Next, they conduct a procedure to request a vote. In parallel, a background process starts to update the records at the RE with the latest copy. The records with the most recent term are obtained via the following procedure: (1) exchange snapshots with the entire list of K,VN between all RE of cluster in update checker; (2) determine records with newer terms by comparing with local term values; (3) send a request for data record to each RE for all K that has a newer T; and (4) update the records message with list of {K, VN, [data record]} in the request. In cases where no leader is elected, the RE with maximum number of priority state records with the latest term is elected as the leader.

HA state data records may be recovered. During replication, at least one replica is as much updated as the leader in all cases, unless the quorum size is 1 (e.g., in high availability cases). For cases when the quorum size is higher than 1, the leader election process is used to select the new leader with updated (e.g., latest) UE data records. When the quorum size is 1 (e.g., in high availability mode), multiple failures can result in the system not being able to recover the latest state. In that case, the system may needs input from the outside (e.g., the client, UE) to detect and recover states.

FIG. 9 is a diagram illustrating cache insertion and deletion. Cache of state records is used to reduce process switching time (e.g., if the data is available in local memory, context switches and requests to fetch data may be avoided). FIG. 9 shows an architecture 900 for the "if-cache" interface of FIG. 7. Since cache space is limited, there is a mechanism to manage the cache. A Cache Controller 902 in RE 308 uses network policy and other learned data to manage the cache. Cache insertion and deletion is based on the policies, learned data, and input from service discovery.

During cache insertion, each request from the client (UE) for service results in dynamic service discovery. The cache controller subscribes to these requests for the set of UEs that are served by that RE master. If the state record(s) for that UE are not cached, the cache controller pushes them to local NF memory, according to feedback from dynamic service discovery, via the "if-cache" interface. Note that a UE may have multiple keys/records (as a result of multiple connections). All records may be cached, as this results in only a small increase in cache memory consumption.

During cache deletion, the local cache access manager at the NF uses a Least Recently Used (LRU) policy to determine removal from memory. A Cache Access Manager 904 for the NF 302 and the Cache Controller 902 in the RE 308 synchronize the contents of their caches.

Embodiments may achieve advantages. Distributed networking allows remote database backup to not be needed for massive failures, which increases the network restart speed after a failure. Other node-based solutions such as N+k replication are more expensive and do not provide high availability in the event of multiple failures. For solutions that target high availability, distribution, and geo-replication, embodiments can assist with recovery to a consistent state.

Figure 10:
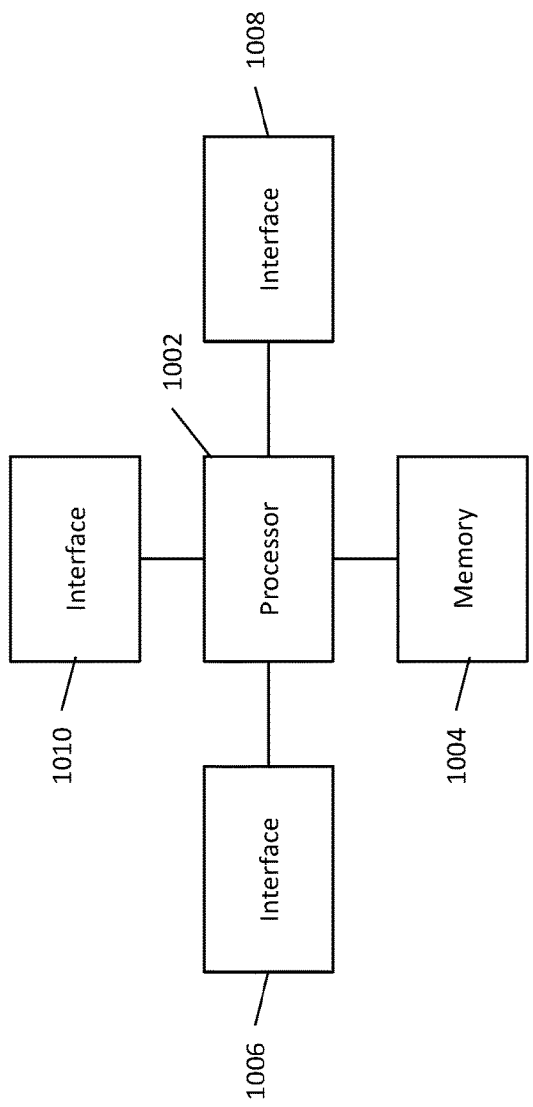
FIG. 10 is a block diagram of a processing system, in accordance with some embodiments.

FIG. 10 is a block diagram of a processing system 1000 for performing methods described herein, which may be installed in a host device. As shown, the processing system 1000 includes a processor 1002, a memory 1004, and interfaces 1006-1010, which may (or may not) be arranged as shown in FIG. 10. The processor 1002 may be any component or collection of components adapted to perform computations and/or other processing related tasks, and the memory 1004 may be any component or collection of components adapted to store programming and/or instructions for execution by the processor 1002. In an embodiment, the memory 1004 includes a non-transitory computer readable medium. The interfaces 1006, 1008, 1010 may be any component or collection of components that allow the processing system 1000 to communicate with other devices/components and/or a user. For example, one or more of the interfaces 1006, 1008, 1010 may be adapted to communicate data, control, or management messages from the processor 1002 to applications installed on the host device and/or a remote device. As another example, one or more of the interfaces 1006, 1008, 1010 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
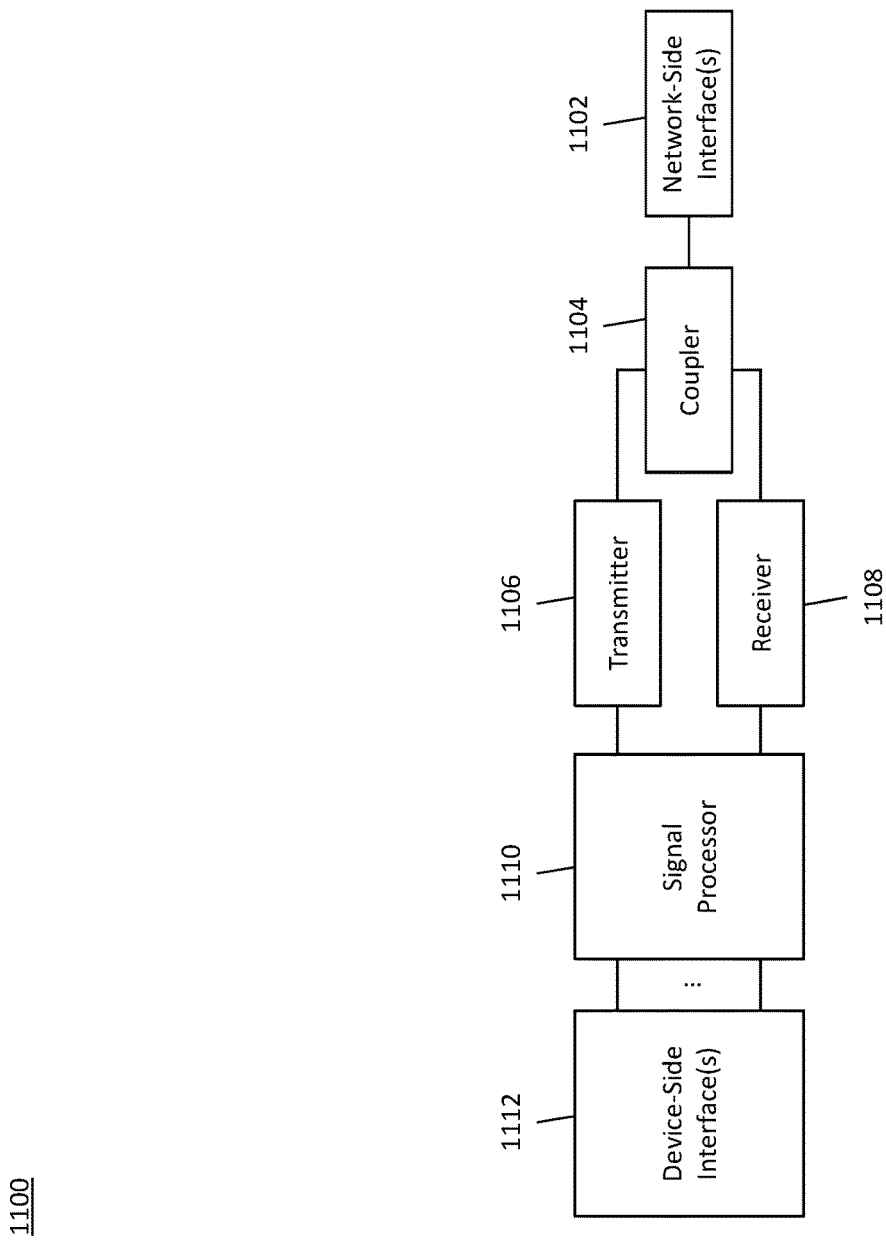
FIG. 11 is a block diagram of a transceiver, in accordance with some embodiments.

In some embodiments, one or more of the interfaces 1006, 1008, 1010 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a receiving unit/module, a determining unit/module, a programming unit/module, an updating unit/module, a producing unit/module, a storing unit/module, a transmitting unit/module, a polling unit/module, a reconstructing unit/module, a retrieving unit/module, a replicating unit/module, a marking unit/module, an indicating unit/module, a prioritizing unit/module, an accepting unit/module, a caching unit/module, a rejecting unit/module, a transitioning unit/module, a pushing unit/module, an initializing unit/module, and/or a reconstructing unit/module. The respective units/modules may be hardware, software, or a combination thereof. For instance, one or more of the units/modules may be an integrated circuit, such as field programmable gate arrays (FPGAs) or application-specific integrated circuits (ASICs).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, by a virtual network function, comprising:
    receiving a first request from a user equipment (UE), the first request comprising first parameters and a first token, the first token being a vector value corresponding to a session state for the UE;
    determining the session state for the UE according to the first token;
    programming network resources according to the session state, the programming updating states of the network resources, the session state for the UE being updated when the states of the network resources are updated;
    producing a second token corresponding to the updated session state for the UE;
    storing the updated session state and the second token;
    transmitting the second token to the UE;
    receiving a second request from the UE, the second request comprising the second token;
    determining a mismatch in session state for the UE according to the second token;
    determining states of the network resources;
    reconstructing the session state for the UE according to the determined states of the network resources;
    producing a third token corresponding to the reconstructed session state for the UE;
    storing the reconstructed session state and the third token; and
    transmitting the third token and rollback parameters to the UE, the rollback parameters comprising information about the reconstructed session state.

2. The method of claim 1, wherein determining the mismatch in the session state for the UE comprises:
    retrieving the session state for the UE according to the second token; and
    determining the retrieved session state corresponds to a fourth token, the fourth token being different from the second token.

3. The method of claim 1, further comprising:
    polling the network resources; and
    retrieving policy information from the network resources.

4. The method of claim 1, further comprising:
    polling the network resources; and
    retrieving location information, profile information, and authorization information for the UE from the network resources.

5. The method of claim 1, further comprising:
    polling the network resources; and
    determining connection states of the network resources.

6. The method of claim 1, wherein the virtual network function is one of a plurality of virtual network functions, and wherein storing the updated session state and the second token comprises:
    storing the updated session state and the second token in a first data store, the first data store being one of a plurality of data stores; and
    replicating the updated session state from the first data store to other ones of the data stores.

7. The method of claim 6, wherein replicating the updated session state comprises:
    marking replication of the updated session state as complete in response to receiving a quorum of responses from the data stores.

8. The method of claim 7, wherein storing the updated session state and the second token in the first data store comprises:
    indicating a consistency level and a priority level for the updated session state to the first data store, the consistency level being a size of the quorum of the data stores, the priority level being an allocation and retention priority for the session state for the UE.

9. A method, by a user equipment (UE), comprising:
    sending a first request to a virtual network function, the first request comprising first parameters and a first token, the first token being a vector value corresponding to a session state for the UE;
receiving a first response from the virtual network function, the first response comprising a second token, the second token being a vector value corresponding to an updated session state for the UE;
after receiving the first response, sending a second request to the virtual network function, the second request comprising second parameters and the second token; and
receiving a second response from the virtual network function, the second response comprising a third token and rollback parameters, the rollback parameters comprising information about a reconstructed session state for the UE.

10. The method of claim 9 further comprising:
accepting the reconstructed session state in response to determining the UE is able to accept the reconstructed session state; and
transitioning to the reconstructed session state.

11. The method of claim 9 further comprising:
rejecting the reconstructed session state in response to determining the UE is unable to accept the reconstructed session state; and
re-initializing a new session with the virtual network function.

12. The method of claim 9 further comprising:
rejecting the reconstructed session state in response to determining the UE is unable to accept the reconstructed session state; and
partially rolling back to a previous session state with the virtual network function.

13. A system comprising:
a plurality of replication entities; and
a plurality of virtual network functions in communication with the replication entities, each of the virtual network functions being configured to:
receive a first request from a user equipment (UE), the first request indicating keys and a first token for the UE, the first token identifying a session state for the UE to each of the virtual network functions; and
update the session state for the UE in response to receiving a quorum of responses from the replication entities;
transmit information about the updated session state to the UE;
receive a second request from the UE, the second request indicating a second token for the UE, the second token identifying the updated session state for the UE to each of the virtual network functions;
determine a mismatch in session state for the UE according to the second token;
reconstruct the session state for the UE in response to determining the mismatch in the session state; and
transmit information about the reconstructed session state to the UE.

14. The system of claim 13, wherein each of the virtual network functions are further configured to:
program network resources according to the first request from the UE, the programming resulting in an update for the session state for the UE; and
store the updated session state in the replication entities.

15. The system of claim 13, wherein each of the virtual network functions are further configured to:
indicate priorities of records to the replication entities according to an allocation and retention priority.

16. The system of claim 13, wherein each of the replication entities are configured to:
cache records stored in the replication entities; and
push the cached records to the virtual network functions according to feedback from dynamic service discovery.

17. A network function comprising:
a non-transitory memory storage comprising instructions; and
one or more processors in communication with the memory, wherein the one or more processors execute the instructions to:
receive a first request from a user equipment (UE), the first request comprising first parameters and a first token, the first token being a vector value corresponding to a session state for the UE;
determine the session state for the UE according to the first token;
program network resources according to the session state, the programming updating states of the network resources, the session state for the UE being updated when the states of the network resources are updated;
produce a second token corresponding to the updated session state for the UE;
store the updated session state and the second token;
transmit the second token to the UE;
receive a second request from the UE, the second request comprising the second token;
determine a mismatch in session state for the UE according to the second token;
determine states of the network resources;
reconstruct the session state for the UE according to the states of the network resources;
produce a third token corresponding to the reconstructed session state for the UE;
store the reconstructed session state and the third token; and
transmit the third token and rollback parameters to the UE, the rollback parameters comprising information about the reconstructed session state.

18. A user equipment (UE) comprising:
a non-transitory memory storage comprising instructions; and
one or more processors in communication with the memory, wherein the one or more processors execute the instructions to:
send a first request to a virtual network function, the first request comprising first parameters and a first token, the first token being a vector value corresponding to a session state for the UE;
receive a first response from the virtual network function, the first response comprising a second token, the second token being a vector value corresponding to an updated session state for the UE;
after receiving the first response, send a second request to the virtual network function, the second request comprising second parameters and the second token; and
receive a second response from the virtual network function, the second response comprising a third token and rollback parameters, the rollback parameters comprising information about a reconstructed session state for the UE.

* * * * *